US010997028B2

(12) United States Patent
Sokolova et al.

(10) Patent No.: US 10,997,028 B2
(45) Date of Patent: *May 4, 2021

(54) ENVIRONMENTAL AWARE WITNESS FOR ACTIVE-ACTIVE STORAGE CLUSTER NODES

(71) Applicant: EMC IP Holding Company LLC, Hopkinton, MA (US)

(72) Inventors: Svetlana O. Sokolova, Framingham, MA (US); Benjamin Yoder, Chandler, AZ (US); Deepak Vokaliga, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,687

(22) Filed: Jan. 30, 2020

(65) Prior Publication Data
US 2020/0167233 A1 May 28, 2020

Related U.S. Application Data

(63) Continuation of application No. 15/887,295, filed on Feb. 2, 2018, now Pat. No. 10,592,342.

(51) Int. Cl.
G06F 11/14 (2006.01)
G06F 11/20 (2006.01)

(52) U.S. Cl.
CPC ...... *G06F 11/1425* (2013.01); *G06F 11/2025* (2013.01)

(58) Field of Classification Search
CPC ............. G06F 11/0709; G06F 11/0727; G06F 11/0793; G06F 11/0754; G06F 11/0757; G06F 11/076; G06F 11/1425; G06F 11/2025; G06F 11/2023; G06F 11/2043; G06F 11/2046; G06F 11/2064; G06F 11/3006; G06F 11/3034; G06F 11/3051; G06F 9/5061; H04L 41/0893; H04L 41/0816; H04L 41/0873
See application file for complete search history.

(56) References Cited

U.S. PATENT DOCUMENTS 6,192,401 B1 * 2/2001 Modiri .................. G06F 9/5061
370/254
6,363,495 B1 * 3/2002 MacKenzie ......... G06F 11/1482
714/37

(Continued)

*Primary Examiner* — Gabriel Chu
(74) *Attorney, Agent, or Firm* — Krishnendu Gupta; Anne-Marie Dinius

(57) ABSTRACT

The system, devices, and methods disclosed herein relate to a dynamic, robust method for choosing a "winner" in an active-active data storage network. In the systems and methods disclosed herein, two or more intelligent nodes within an active-active data storage network periodically exchange operational parameters in an ongoing negotiation regarding who should be the winner in the event of a communication failure within the network. The winner is chosen dynamically based on the operational parameters. A witness is kept apprised of the winner. In the event of a communication failure between the two nodes, the winner is chosen by the witness based on the most recently negotiated lock file reported by one or both of the nodes.

20 Claims, 4 Drawing Sheets

(56) References Cited

U.S. PATENT DOCUMENTS

| | | | | |
|---|---|---|---|---|
| 6,662,219 B1* | 12/2003 | Nishanov | ................ | H04L 29/06 |
| | | | | 709/209 |
| 7,631,066 B1* | 12/2009 | Schatz | .................. | G06F 9/5016 |
| | | | | 709/224 |
| 8,578,204 B1* | 11/2013 | Ortenberg | ........... | G06F 11/1425 |
| | | | | 714/2 |
| 2005/0177766 A1* | 8/2005 | Lee | ....................... | G06F 11/008 |
| | | | | 714/11 |
| 2005/0268153 A1* | 12/2005 | Armstrong | .......... | G06F 11/0709 |
| | | | | 714/4.1 |
| 2007/0016822 A1* | 1/2007 | Rao | ....................... | G06F 9/5061 |
| | | | | 714/4.11 |
| 2011/0252270 A1* | 10/2011 | Abraham | ............ | G06F 11/1425 |
| | | | | 714/4.1 |
| 2016/0103745 A1* | 4/2016 | Zhou | ................... | G06F 11/1658 |
| | | | | 714/6.3 |
| 2017/0302502 A1* | 10/2017 | Feng | .................... | G06F 11/0757 |
| 2018/0268011 A1* | 9/2018 | Cao | ..................... | G06F 16/1774 |
| 2019/0173982 A1* | 6/2019 | Dubey | ................. | H04L 69/325 |

* cited by examiner

ENVIRONMENTAL AWARE WITNESS FOR ACTIVE-ACTIVE STORAGE CLUSTER NODES

FIELD OF THE INVENTION

This disclosure is related to the field of data storage and, more particularly, to systems and methods for improving witness designations for active-active data storage systems.

BACKGROUND

In current storage networks, and particularly storage networks including geographically remote directors (or nodes) and storage resources, preserving or reducing bandwidth between resources and directors while providing optimized data availability and access is highly desirable. Data access may be localized, in part, to improve access speed to pages requested by host devices. Caching pages at directors provides localization, however, it is desirable that the cached data be kept coherent with respect to modifications at other directors that may be caching the same data. An example of a system for providing distributed cache coherence is described in U.S. Patent App. Pub. No. 2006/0031450 to Unrau et al., entitled "Systems and Methods for Providing Distributed Cache Coherency," which is incorporated herein by reference. Other systems and techniques for managing and sharing storage array functions among multiple storage groups in a storage network are described, for example, in U.S. Pat. No. 7,266,706 to Brown et al. entitled "Methods and Systems for Implementing Shared Disk Array Management Functions," which is incorporated herein by reference.

Data transfer among storage devices, including transfers for data replication or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof.

In an active-active storage system, if there are multiple interfaces to a storage device, each of the interfaces may provide equal access to the storage device. With active-active storage access, hosts in different locations may have simultaneous read/write access via respective interfaces to the same storage device. Various failures in an active-active system may adversely impact synchronization and hinder the ability of the system to recover. Especially problematic are failure scenarios in active-active storage systems involving asynchronous data transmissions.

Specifically, in active-active data storage environments, it is necessary to designate a witness to resolve split-brain situations. A split-brain situation can occur when communication between the various storage nodes is lost. In this type of situation, the witness acts as a mediator by choosing one of the storage nodes as a winner and making the other a loser. The winning storage node continues to be available, while the losing storage node suspends its availability for I/O requests.

At the moment of failure, it is important to choose the best storage node as the winner because storage nodes may have different configurations and state characteristics at the moment of failure. In today's technology, witness selection relies on periodic state exchange messages as the sole characteristic in choosing which node should take over in the event of communication loss between active-active nodes.

Witness technology available today, or implemented by storage array vendors, does not take into account the overall availability criteria of one node versus another node when determining who should be the winner. Current implementations of witness technology only focus on the health of the local active-active arrays and their ability to communicate with the witness itself and the remote node in the event of system or network failure.

Witness technology fails to account for the "overall characteristics" of one node when compared with another node. For example, one node may have a valid data replication leg, more CPU horsepower, more memory banks, and the like. There is thus a need for witness technology to make more robust decisions when choosing a winning node to be used in failover mode.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter that is set forth by the claims presented below. All examples and features mentioned below can be combined in any technically possible way.

The systems and methods disclosed herein are used when communication has been lost between active-active nodes. When this occurs, the witness is asked to grant the winner role to one of the nodes. The grant assignment happens based on the formerly negotiated preferred winner. A preferred winner negotiation exchange is constantly transpiring between the nodes based on each node's operational parameters so long as the nodes can communicate with each other. The result of the latest negotiation is used during the node to node communication failure to arbitrate the winner with the witness.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
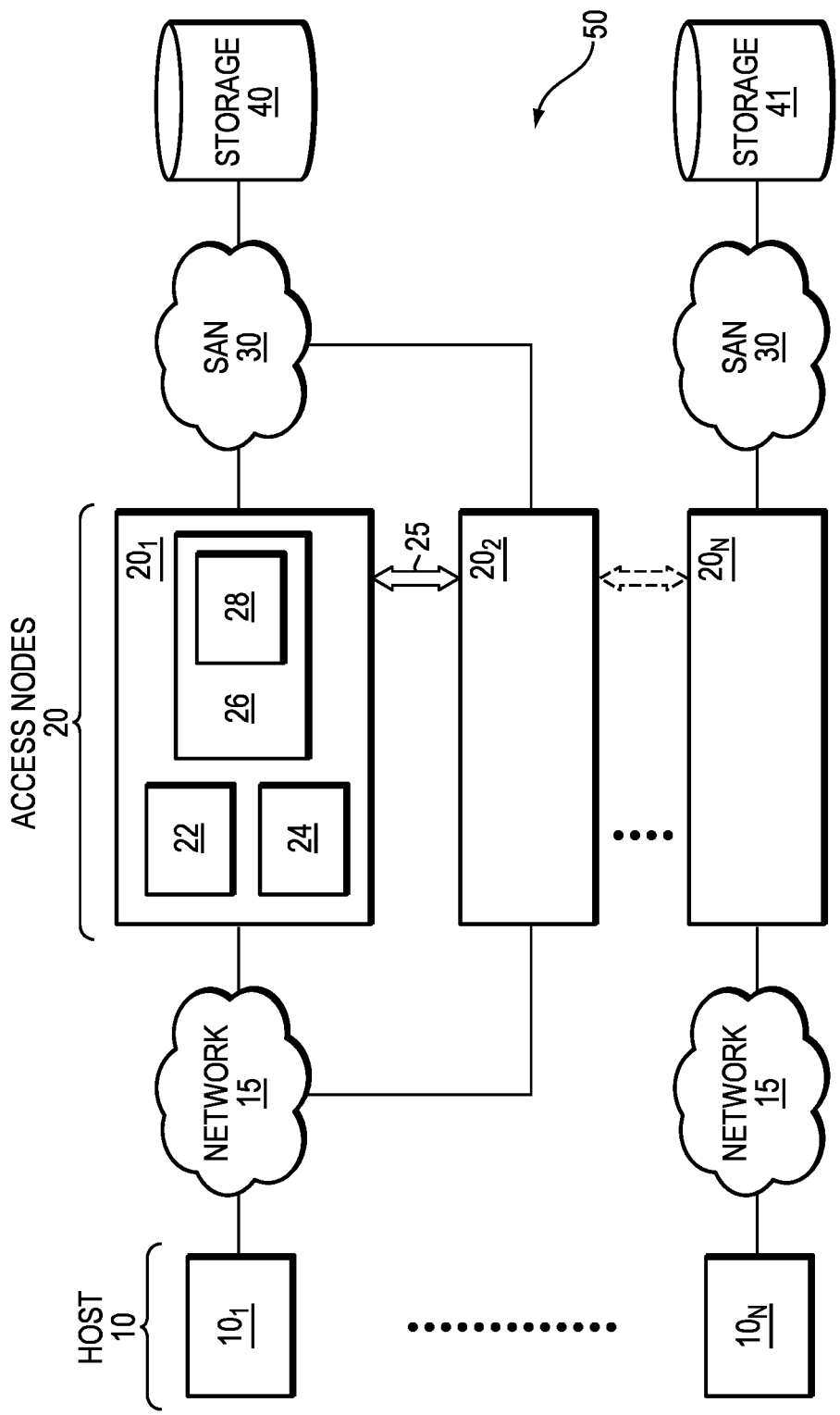
FIG. 1 is an architectural diagram of a network configuration that may be used in accordance with embodiments of the system described herein.

FIG. 1 shows a network configuration 50 that may be used in accordance with an embodiment of the system described herein. As shown, a plurality of host devices 10 (10 1 to 10 N) are communicably coupled with a plurality of access nodes 20 (20 1, 20 2 to 20 N). Each of the access nodes 20 may include a processor (CPU) component 22, such as a microprocessor or other intelligence module, a cache component 24 (e.g., RAM cache), an instance of a distributed cache manager 26 and/or other local storage and communication ports. (In general, "N" is used herein to indicate an indefinite plurality, so that the number "N" when referred to one component does not necessarily equal the number "N" of a different component. For example, the number of hosts 10 does not, but may, equal the number of access nodes 20 in FIG. 1. Cache memory may be considered memory that is faster and more easily accessible by a processor than other non-cache memory used by a device.

Each of the hosts 10 may be communicably coupled to one or more of access nodes 20 over one or more network connections 15. It is noted that host devices 10 may be operatively coupled with access nodes 20 over any of a number of connection schemes as required for the specific application and geographical location relative to each of the access nodes 20, including, for example, a direct wired or wireless connection, an Internet connection, a local area network (LAN) type connection, a wide area network (WAN) type connection, a VLAN, a proprietary network connection, a Fibre channel (FC) network etc.

Each of the access nodes 20 may also include, or be communicably coupled with, one or more volume management functions (VMFs), and may be communicably coupled with one or multiple storage resources 40, 41, each including one or more disk drives and/or other storage volume, over one or more storage area networks (SAN) 30, and/or other appropriate network, such as a LAN, WAN, etc. The access nodes 20 may be located in close physical proximity to each other or one or more may be remotely located, e.g., geographically remote, from other access nodes. Each of the access nodes 20 may also be able to, intercommunicate with other access nodes over a network 25, such as a private network, an IP network, and/or a Fibre channel (FC) network.

In other embodiments, the access nodes may also be able to communicate over the SAN 30 and/or over the network 15. Several of the access nodes 20 may be grouped together at one or more sites in connection with the multiple storage resources 40, 41 and in which the sites are geographically distant from one another. The system described herein may be used in connection with a VPLEX product produced by Dell, Inc. The system described herein may also be used in connection with a Remote Data Facility (RDF) storage product produced by Dell, Inc., such as a Symmetrix product, a VMAX product, and the like. Although discussed and illustrated in connection with embodiments for a distributed storage system, the system described herein may generally be used in connection with any appropriate distributed processing system.

Each distributed cache manager 26 may be responsible for providing coherence mechanisms for shared data across a distributed set of access nodes. In general, the distributed cache manager 26 may include a module with software executing on a processor or other intelligence module (e.g., ASIC) in an access node. The distributed cache manager 26 may be implemented in a single access node or distributed across multiple intercommunicating access nodes.

In certain aspects, each of the access nodes 20 may be embodied as a controller device, or blade, communicably coupled to the storage network 30 that allows access to data stored on the storage network. However, it may be appreciated that an access node may also be embodied as an intelligent fabric switch, a hub adapter and/or other appropriate network device. Because Locality Conscious Directory Migration (LCDM) is applicable to databases, any suitable networked compute node may be configured to operate as an access node with distributed cache manager functionality. For example, a distributed cache manager may be run on a desktop computer with a network connection.

According to the system described herein, a distributed storage system may enable a storage device to be exported from multiple distributed access nodes, which may be either appliances or arrays, for example. With an active-active storage system, hosts in different locations may have simultaneous write access to the same exported storage device through a local front-end thereof (i.e., an access node). The distributed storage system may be responsible for providing globally consistent and coherent data access. A witness facility/node, as further discussed elsewhere herein, may enable the distributed storage system to meet consistency guarantees and maximize data access even when individual front-ends and/or their interconnects fail.

Figure 2:
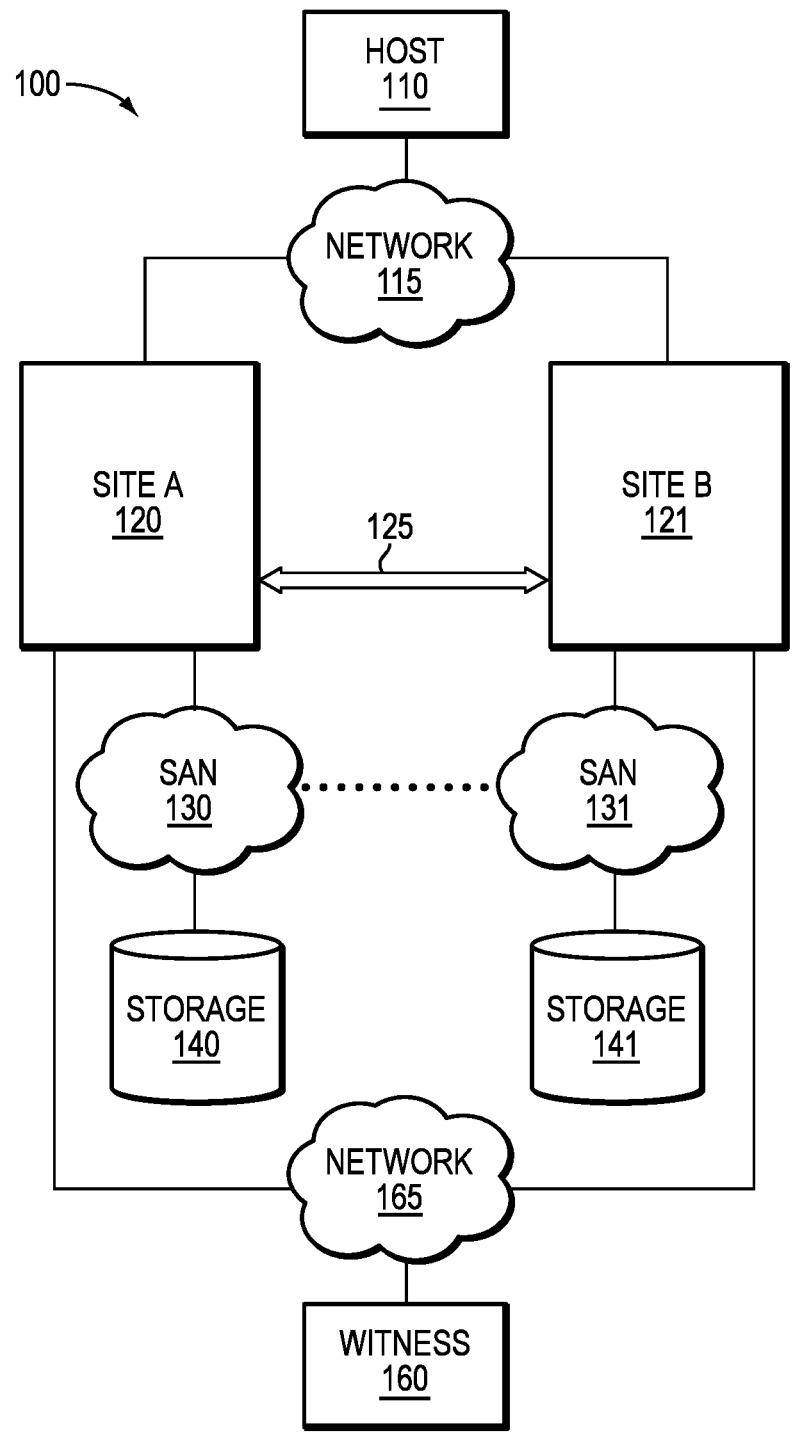
FIG. 2 is a schematic illustration showing a distributed storage system according to embodiments of the system described herein.

FIG. 2 is a schematic illustration showing a distributed storage system 100 according to an embodiment of the system described herein. The system may include a plurality of multiple compute sites, such as site A 120 and site B 121, which may each include one or more access nodes like the access nodes 20 discussed elsewhere herein. The plurality of multiple compute sites forms a collection of sites. Although two compute sites are shown, more than two compute sites may be used and operated in connection with the system described herein. As further discussed elsewhere herein, the sites 120, 121 may be located geographically distant from each other. In an embodiment, the distributed storage system 100 may operate in an active-active mode in which multiple sites may provide mirroring for at least some of the data and may handle processing of host read/write I/O requests.

The sites 120, 121 may be connected via an interconnection 125, such as an IP network, an FC network and/or any other appropriate type of network. A host 110 is shown that may communicate with the compute sites 120, 121 via a network 115. The host 110 is representative of any number of hosts that may access the distributed storage system 100 via the network 115.

The multiple compute sites 120, 121 may together be engaged in a joint computation in connection with I/O handling requests of one or more hosts like the host 110 and maintaining a consistent global data cache therebetween. The joint computation may include facilitating data mirroring (including possibly allowing write access to multiple sites) as well as managing access to the mirrored data. In another embodiment, the joint computation may include a distributed cache coherence protocol, which guarantees data consistency for a distributed active-active storage system. The sites 120, 121 may be coupled via SANs 130, 131 to storage resources 140, 141.

The storage resources 140, 141 may be located in proximity to the sites 120, 121 and/or may be remotely located and accessed. In an embodiment, the SANs 130, 131 may be separate networks. Alternatively, in another embodiment, the SANs 130, 131 may be part of the same network, an embodiment shown represented by a dashed line connecting the SANs 130, 131. In various embodiments, the joint computation may include multiple, independent sub-computations and may include operations of a clustered small computer system interface (SCSI) device corresponding to use of external storage nodes that may be accessed by one or more of the sites 120, 121.

The witness node 160 may include a processor (CPU) and other computing components (e.g., a virtual machine) or connection components suitable to perform the functions and features described herein. The witness node 160 may be connected to the sites 120, 121 via a network 165. To improve effectiveness and availability, the witness node 160 may be deployed in an independent fault domain. In addition, there may be more than one witness node 160 in alternate embodiments.

A fault domain is a collection of entities impacted by a given fault. For example, to protect against a given fault of a site disaster, the witness node may be placed at site that is geographically remote from the sites 120, 121. Otherwise, a site disaster event may affect the site with the witness, rendering it unavailable and leading to suspension (freezing) of the joint computation at the surviving site. Further, for example, to respond to intersite communication failures, the network 165 that connects the witness node 160 to the sites 120, 121 may be different than the intersite connection link 125. The given faults to be protected by use of the witness node may depend on customer needs and preferences. In an embodiment, the witness node may be deployed on one or more hosts like that host 110.

One of the responsibilities of the witness 160 is to prevent a split-brain mode in which multiple sites act individually with respect to handling host I/O requests (e.g., write requests) in a manner that may cause data divergence between sites and/or violate global consistency of data and/or individually perform computations that may cause the joint computation to become disjointed and the results irreconcilable.

Figure 3:
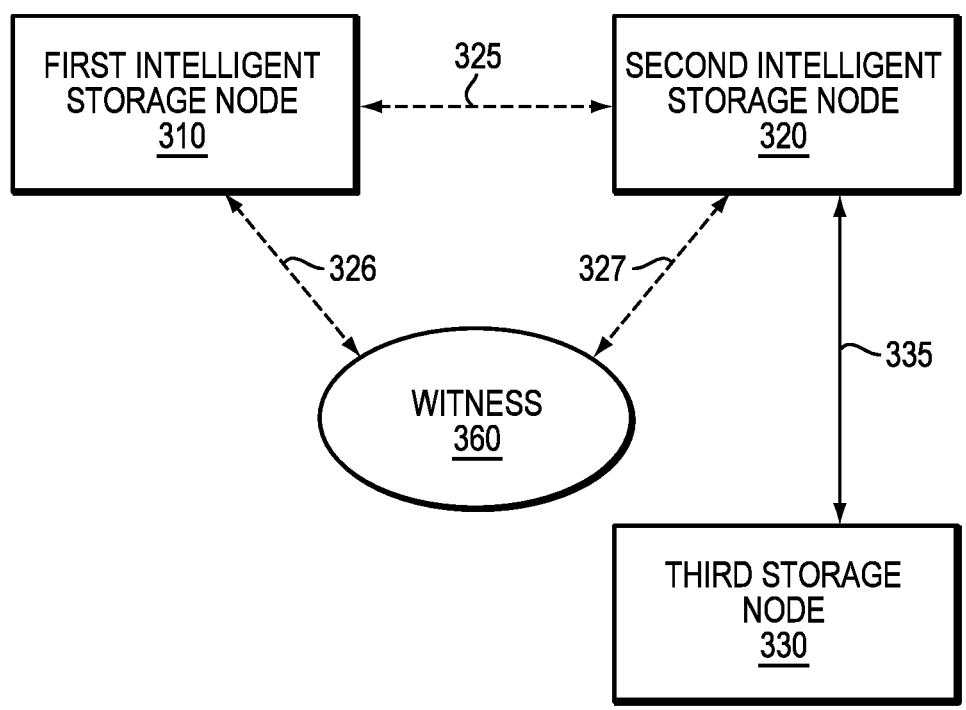
FIG. 3 is a schematic illustration of a portion of a distributed storage system according to embodiments of the system described herein.

FIG. 3 is a schematic illustration of a portion 300 of the distributed storage system 100, which will be used to describe embodiments herein. It should be understood that embodiments herein may contain architecture similar to that depicted in FIGS. 1 and 2.

FIG. 3 shows a portion of an active-active distributed data processing network 300 having a first intelligent storage node 310 and a second intelligent storage node 320. The first 310 and second intelligent storage nodes 320 are communicatively coupled via communication link 325. We use the term "intelligent" in the context of the storage nodes to indicate that the nodes have processing and memory capabilities associated therewith, either integrated into the hardware of the nodes themselves, or externally located, but communicatively coupled to the nodes. The first 310 and second intelligent storage nodes 320 contain processing capabilities and memory (not shown) sufficient enough to be able to exchange and store information between themselves.

In addition, the active-active network 300 further comprises a witness 360, which could be a stand-alone node or processing unit in some embodiments. In alternate embodiments, witness 360 could be located within the processing capabilities of first intelligent storage node 310 or second intelligent storage node 320. In yet alternate embodiments, there could be multiple witnesses 360. In yet additional embodiments, the one or more witnesses 360 could be located in different networks in order to enhance fault tolerance.

Irrespective of the exact physical location of the witness, witness 360 would be communicatively coupled to first intelligent storage node 310 via communication link 326 and second intelligent storage node 320 via communication link 327. In addition, illustratively, the active-active network of FIG. 3 also includes a data replication node 330, also called a third storage node herein, which is communicatively coupled to the second intelligent storage node 320 via communication link 335.

Communication links 325 and 335 can be a synchronous connection. Communication links 326 and 327 may also be synchronous or asynchronous communication links.

Embodiments herein are directed to overcoming the situation that occurs when the communication link 325 between the first intelligent storage node 310 and the second intelligent storage node 320 is degraded below a threshold value. This situation is to be avoided in an active-active data storage network 300 because first intelligent storage node 310 and second intelligent storage node 320 should, ideally, be mirror images of one another. If their ability to copy data from one to the other is compromised, any hosts seeking access to the active-active network 300 would need to be informed that they should alter their read/write path into the network 300.

Figure 4:
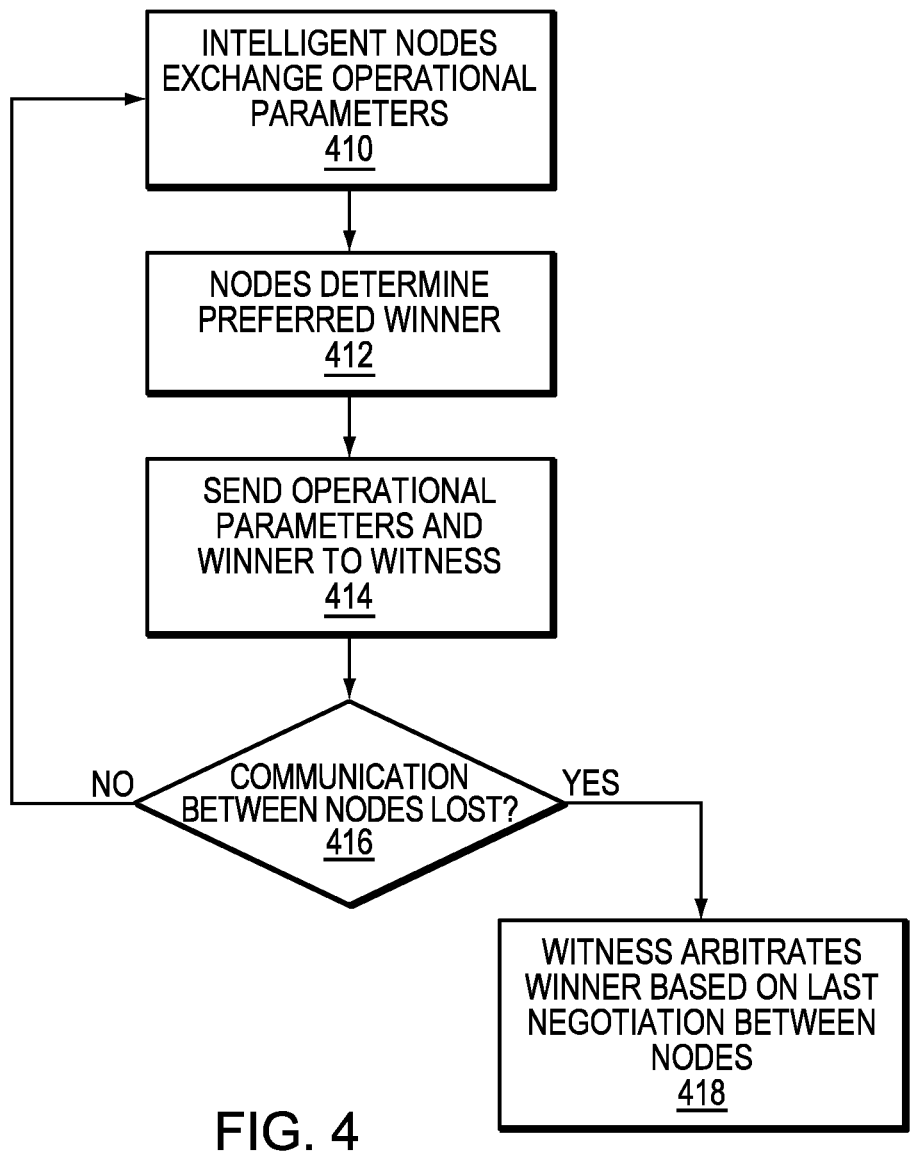
FIG. 4 is a flow diagram of method steps according to embodiments described herein.

FIG. 4 depicts method steps associated with embodiments for dynamically assigning a winning node in the event of degraded communication between first 310 and second intelligent storage nodes 320. FIG. 4 further illustrates steps performed in system and device embodiments as well.

As can be seen in FIG. 4, the first intelligent storage node 310 and the second intelligent storage node 320 periodically exchange operational parameters 410 with one another. This exchange facilitates a negotiation between the two nodes 310, 320 as to which node should be designated as "winner" in the event the quality of the communication link 325 falls below a threshold value. In order to determine which node 310, 320 would be the winner, at least two operational parameters of the nodes 310, 320 are taken into consideration.

The winner designation is saved in a lock file, which is sent 414 to witness 360. In some embodiments, the lock file can also contain information regarding operational parameters, which could also be sent 414 to the witness 360. If the communication between the nodes is lost 416, the witness arbitrates 418 the winner based on the last received lock file. If the quality measurement of the communication link does not fall below a threshold, the nodes 310, 320 continue to exchange operational parameters in order to negotiate which should be the winner.

Each node 310, 320 will have a specific lock containing its operational parameters. Operational parameters can be configuration settings, state characteristics, and the like. In some embodiments, one of the nodes 310, 320 will have been designated as biased toward being the winner. Assuming in one embodiment the first intelligent storage node 310 was biased to be the winner, it could send its lock to witness 360 before second intelligent storage node 320 sends its lock. In this way, witness 360 will be made aware of which node 310, 320 was biased toward being winner in the event of a communication failure. The nodes 310, 320 or in alternate embodiments, witness 360, may consider information related to bias as one of the criteria it uses in deciding which node 310, 320 to appoint as winner. Additional operational parameters could be, without limitation, a synchronous communication connection to a third storage node, an asynchronous communication connection to a third storage node, a bias role, a non-bias role, a data replication pathway, a memory board state, or a faulted hardware state.

In some embodiments, active-active networks 300 could be customized to weight different operational parameters differently, thereby giving preference to some operational parameters over others.

In some instances, witness 360 will receive a lock from each active node 310, 320. If, however, one of the nodes was impaired significantly enough to prohibit its ability to send a lock to witness 360, witness 360 may have to determine the winner without having the benefit of receiving all locks from all nodes 310, 320. Although FIG. 3 shows two nodes 310, 320, in alternate embodiments, there could be more than two nodes 310, 320.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for dynamically assigning a winning node in an active-active data storage network comprising the steps of:
   sending a first operational parameter from a first node to a second node;
   sending a second operational parameter from the second node to the first node, the first and second nodes being part of an active-active data storage network;
   negotiating between the first and second nodes which would be the winner in the event a quality measurement of a communication link between the first and second nodes falls below a threshold value, wherein the negotiation includes evaluating the first and second operational parameters;
   choosing a winner based on at least the first and second operational parameters;
   recording a winner in a lock file; and
   transmitting the lock file to a witness.

2. The method of claim 1, wherein the first operational parameter and the second operation parameter correspond to an equivalent parameter as between the first node and the second node.

3. The method of claim 1, wherein the first operational parameter or the second operational parameter is a measure of a cache availability.

4. The method of claim 1, wherein the first operational parameter is a health measurement for the first node.

5. The method of claim 1, wherein the second operational parameter is a health measurement for the second node.

6. The method of claim 1, wherein the first operational parameter is a synchronous communication connection to a third storage node, an asynchronous communication connection to a third storage node, a bias role, a non-bias role, a data replication pathway, a memory board state, or a faulted hardware state for the first node.

7. The method of claim 1, wherein the second operational parameter is a synchronous communication connection to a third storage node, an asynchronous communication connection to a third storage node, a bias role, a non-bias role, a data replication pathway, a memory board state, or a faulted hardware state, for the second node.

8. A system for managing an active-active distributed data processing network, comprising:
   a first intelligent storage node and a second intelligent storage node in an active-active network configuration connected via a communication link, wherein the first intelligent storage node and the second intelligent storage node are configured to monitor a quality measurement of the communication link;
   a witness node communicatively coupled to the first intelligent storage node and the second intelligent storage node; and
   a processor having logic stored thereon configured to:
      send a first operational parameter from a first node to a second node;
      send a second operational parameter from the second node to the first node, the first and second nodes being part of an active-active data storage network;
      negotiate between the first and second nodes which would be the winner in the event a quality measurement of a communication link between the first and second nodes falls below a threshold value, wherein the negotiation includes evaluating the first and second operational parameters;
      choose a winner based on at least the first and second operational parameters;
      record a winner in a lock file; and
      transmit the lock file to a witness.

9. The system of claim 8, wherein the first operational parameter and the second operation parameter correspond to an equivalent parameter as between the first node and the second node.

10. The system of claim 8, wherein the first operational parameter or the second operational parameter is a measure of a cache availability.

11. The system of claim 8, wherein the first operational parameter is a health measurement for the first node.

12. The system of claim 8, wherein the second operational parameter is a health measurement for the second node.

13. The system of claim 8, wherein the first operational parameter is a synchronous communication connection to a third storage node, an asynchronous communication connection to a third storage node, a bias role, a non-bias role, a data replication pathway, a memory board state, or a faulted hardware state for the first node.

14. The system of claim 8, wherein the second operational parameter is a synchronous communication connection to a third storage node, an asynchronous communication connection to a third storage node, a bias role, a non-bias role, a data replication pathway, a memory board state, or a faulted hardware state for the second node.

15. A non-transitory computer readable storage medium containing software for dynamically assigning a winning node in an active-active data storage network comprising performing the steps of:
   sending a first operational parameter from a first node to a second node;
   sending a second operational parameter from the second node to the first node, the first and second nodes being part of an active-active data storage network;
   negotiating between the first and second nodes which would be the winner in the event a quality measurement of a communication link between the first and second nodes falls below a threshold value, wherein the negotiation includes evaluating the first and second operational parameters;

choosing a winner based on at least the first and second operational parameters;

recording a winner in a lock file; and transmitting the lock file to a witness.

16. The non-transitory computer readable storage medium of claim 15, wherein the first operational parameter and the second operation parameter correspond to an equivalent parameter as between the first node and the second node.

17. The non-transitory computer readable storage medium of claim 15, wherein the first operational parameter or the second operational parameter is a measure of a cache availability.

18. The non-transitory computer readable storage medium of claim 15, wherein the first operational parameter is a health measurement for the first node.

19. The non-transitory computer readable storage medium of claim 15, wherein the second operational parameter is a health measurement for the second node.

20. The non-transitory computer readable storage medium of claim 15, wherein the first operational parameter is a synchronous communication connection to a third storage node, an asynchronous communication connection to a third storage node, a bias role, a non-bias role, a data replication pathway, a memory board state, or a faulted hardware state for the first node, or the second operational parameter is a synchronous communication connection to a third storage node, an asynchronous communication connection to a third storage node, a bias role, a non-bias role, a data replication pathway, a memory board state, or a faulted hardware state for the second node.

* * * * *